United States Patent
Kerber et al.

(10) Patent No.: US 9,694,795 B2
(45) Date of Patent: Jul. 4, 2017

(54) METHOD FOR DETERMINING THE CONDITIONS OF AN UNDERLYING SURFACE DURING UNBRAKED OR BRAKED TRAVEL OF A VEHICLE

(71) Applicant: Continental Teves AG & Co., oHG, Frankfurt (DE)

(72) Inventors: Henning Kerber, Darmstadt (DE); Mario Roszyk, Wehrheim (DE); Dieter Burkhard, Bingen-Büdesheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 161 days.

(21) Appl. No.: 14/783,586

(22) PCT Filed: Apr. 14, 2014

(86) PCT No.: PCT/EP2014/057500
§ 371 (c)(1),
(2) Date: Oct. 9, 2015

(87) PCT Pub. No.: WO2014/173714
PCT Pub. Date: Oct. 30, 2014

(65) Prior Publication Data
US 2016/0039397 A1  Feb. 11, 2016

(30) Foreign Application Priority Data
Apr. 25, 2013 (DE) .......... 10 2013 207 563

(51) Int. Cl.
*B60T 8/1763* (2006.01)
*B60T 8/172* (2006.01)

(52) U.S. Cl.
CPC .......... *B60T 8/1763* (2013.01); *B60T 8/172* (2013.01); *B60T 2210/14* (2013.01)

(58) Field of Classification Search
CPC ....... B25B 23/00; B25B 19/00; B60T 8/1763; B60T 8/172; B60T 2210/14

USPC .......................................................... 701/74
See application file for complete search history.

(56) References Cited

U.S. PATENT DOCUMENTS

| | | | |
|---|---|---|---|
| 5,719,565 | A | 2/1998 | Tsuno |
| 6,266,602 | B1 | 7/2001 | Yamaura |
| 6,385,525 | B2 | 5/2002 | Watanabe |
| 6,926,373 | B2 | 8/2005 | Burkhard |
| 2001/0029421 | A1 | 10/2001 | Watanabe |

FOREIGN PATENT DOCUMENTS

| | | |
|---|---|---|
| DE | 19626398 | 1/1997 |
| DE | 19910099 | 11/1999 |
| DE | 10007142 | 8/2000 |
| DE | 10020215 | 2/2001 |
| DE | 10117351 | 10/2001 |
| EP | 1294599 | 2/2011 |

OTHER PUBLICATIONS

German Search Report for German Application No. 10 2013 207 563.4 mailed Dec. 4, 2013, including partial translation.
International Search Report for International Application No. PCT/EP2014/057500 mailed Jul. 23, 2014.

*Primary Examiner* — Brian P Sweeney
(74) *Attorney, Agent, or Firm* — RatnerPrestia

(57) ABSTRACT

A method for determining the conditions of an underlying surface during unbraked or braked travel of a vehicle by a wheel-specific characteristic variable which is derived from a change over time in the wheel speed detected at at least one vehicle wheel. According to invention there is provision that a) a jolt signal is formed by double differentiation of the wheel speed, b) in order to form the characteristic variable the difference between the absolute value of the jolt signal and a tolerance value is summed or integrated over time, and c) the condition of the underlying surface is determined by comparing the characteristic variable with an oscillation signal threshold value.

16 Claims, No Drawings

METHOD FOR DETERMINING THE CONDITIONS OF AN UNDERLYING SURFACE DURING UNBRAKED OR BRAKED TRAVEL OF A VEHICLE

CROSS REFERENCE TO RELATED APPLICATIONS

This application is the U.S. National Phase Application of PCT International Application No. PCT/EP2014/057500, filed Apr. 14, 2014, which claims priority to German Patent Application No. 10 2013 207 563.4, filed Apr. 25, 2013, the contents of such applications being incorporated by reference herein.

FIELD OF THE INVENTION

The invention relates to a method for determining road conditions during unbraked or partially braked travel of a vehicle.

BACKGROUND OF THE INVENTION

Systems for preventing locking of the vehicle wheels of vehicles (anti-lock braking systems, ABS) are known.

The control parameters of such an ABS system are set in such a way that different roadway conditions, i.e. both uneven roadways and gravel roadways, are taken into account in order to prevent a deterioration in the effect of the ABS system. The reason for this is that unevenesses in the roadway represent a disturbance variable in the ABS control circuit, since the impacts effected on the vehicle wheel by such unevenesses can result in a short-term occurrence of slip before the actual locking pressure level is reached.

In order to take account of the road conditions, a so-called rough roadway detection function is integrated into the ABS system in order to adjust controlled variables of the ABS system upon detection of undulating or bumpy or rough roadway surfaces or gravel roadways, which are referred to collectively as "poor roadways", thereby making it possible, e.g., to increase the intervention thresholds of the control algorithms in order to increase the slip values.

A method for determining road conditions is known from the generic document DE 199 10 099 A1, which is incorporated by reference, in which characteristic variables are derived from the dynamic behavior of the vehicle wheels, which is directly influenced exclusively by the roadway, and are evaluated. In this known method, the rotational behavior of the vehicle wheels or the wheel speeds are differentiated, as characteristic variables, with respect to time and poor roadway conditions are detected by comparing the arithmetic mean with the absolute mean, both positive and negative changes in speed being used as wheel acceleration values.

Furthermore, document EP 1 294 599 B1, which is incorporated by reference, discloses a method for improving the control behavior of a braking system (ABS) having anti-lock braking control when imperfections occur in the roadway, such as transverse grooves, potholes, ridges, etc., in which method the rotational behavior of the wheels is evaluated in order to perform anti-lock braking control and to detect imperfections in the roadway when the anti-lock braking control starts, subsequent to partial braking, in that a brief brake pressure reduction phase with a pronounced reduction in brake pressure at a wheel as a consequence of strong wheel deceleration or wheel acceleration, followed by strong re-acceleration of the wheel, is interpreted as being an imperfection in the roadway either if the quotient between the duration of the reduction in pressure and the total duration of the pressure reduction phase multiplied by the re-acceleration of the wheel or the peak value of the re-acceleration or if the re-acceleration change or the peak value of the re-acceleration change exceed prescribed limit values, and in that a rise in brake pressure which is increased compared to the standard ABS braking control is caused as a consequence of the detection of the imperfection in the roadway.

Finally, DE 100 20 215 A1, which is incorporated by reference, also describes a method for detecting a gravel roadway or a similar roadway with a higher slip requirement, in which the vibration behavior of the individual vehicle wheels is detected at the driven axle, and is evaluated, and the driving situation of a gravel roadway is detected when the wheel acceleration exceeds a prescribed wheel acceleration limit value at at least two vehicle wheels and when the at least two vehicle wheels exhibit a specific vibration behavior which is characteristic of a gravel roadway.

SUMMARY OF THE INVENTION

An aspect of the present invention provides an improved method of the initially mentioned type, with which vibrations of a vehicle wheel caused by rough stretches of road can be safely and reliably detected without the control of an ABS system being disturbed by the use of said method according to the invention in the ABS system.

DETAILED DESCRIPTION OF THE PREFERRED EMBODIMENTS

Such a method for determining road conditions during unbraked or braked travel of a vehicle by means of a wheel-specific characteristic variable which is derived from a temporal change in wheel speed detected at at least one vehicle wheel, is distinguished according to the invention in that
a) a jerk signal is formed by taking the second derivative of the wheel speed,
b) the difference between the absolute value of the jerk signal and a tolerance value is summed or integrated with respect to time in order to form the characteristic variable, and
c) the road condition is identified by comparing the characteristic variable with a vibration signal threshold value.

An aspect of the invention is based on the finding that, on an even underlying surface, the wheel speed (angular velocity) and wheel accelerations (angular acceleration) signals, which are decisive for the ABS control, have a continuous profile without large jumps, and that the wheel acceleration, in particular, does not change greatly from one loop to the other (computing cycle of the ABS control algorithm), since the rotational behavior of a vehicle wheel describes a dynamic state. This dynamic state results from the sum of the moments braking torque M_Brems and drive torque M_Antrieb acting on the vehicle wheel and the product of longitudinal tire force F_längs and tire diameter r_dyn (additional moments acting on the wheel, such as, e.g., regenerative torques, could be taken into account here in a similar manner) and is represented as follows, in accordance with the principle of conservation of angular momentum:

$$J \cdot \varphi'' = F\_\text{längs} \cdot r\_\text{dyn} - M\_\text{Brems} + M\_\text{Antrieb}, \quad (1)$$

wherein J is the moment of inertia and $\varphi''$ is the angular acceleration of the wheel.

According to this formula (1), changes in the wheel acceleration result from a change in at least one of the acting moments. Changes in the drive torque can be neglected when the vehicle is braked, in particular with the drive train disengaged, but also for non-driven vehicle wheels in general, and therefore only the braking torque M_Brems, which is influenced by the ABS control, and the outer longitudinal tire force F_längs and its lever arm r_dyn remain as influencing variables.

As a result, any change in the wheel acceleration φ″ which is not a consequence of a change in the braking torque M_Brems results from a change in the longitudinal tire force F_längs or the lever arm r_dyn and therefore represents an external disturbance for the ABS control.

Therefore, according to the invention, the jerk signal j generated by taking the second derivative of the wheel speed φ′ is used as variable for detecting disturbances.

After this jerk signal j is formed according to method step a), the absolute value |j| of the jerk signal j is integrated, provided it exceeds a tolerance threshold j_Toleranz, or, in the discrete case, is summed and, according to method step c), the sum or the integral S_Schwing is compared as characteristic variable according to the following formula $$S\_Schwing = \int (|j| - j\_Toleranz) dt \qquad (2)$$

with a vibration signal threshold value Ggrenz and the result of the comparison is used to determine the road condition. As soon as the characteristic variable S_Schwing has reached this vibration signal threshold value, i.e., $$S\_Schwing \geq G\_grenz$$

a poor roadway is detected.

According to an advantageous embodiment of the method according to the invention, the jerk signal j is filtered by means of a low-pass filter, preferably by means of a PT1 filter, before the method step b) is carried out.

Since, proceeding from the speed signal, the differentiation increases as a function of frequency, vibrations having very high frequencies have a relatively high amplitude in the jerk signal j, and therefore high frequencies would be weighted too heavily if the jerk signal j were not low-pass filtered. The filtering of the jerk signal j results in the damping of the high frequencies above the limit frequency, and therefore the amplitude gain caused by the differentiation of the wheel acceleration in order to generate the jerk signal j is fully compensated. Therefore, the signal profile of the filtered jerk signal j_Filt is a good reflection of the vibration variable of the acceleration signal, which is more meaningful for the ABS control, without high frequencies being weighted too heavily.

According to a refinement, a suitable algorithm for filtering the jerk signal j is a PT1 low-pass filter, which attenuates the amplitude with 20 dB/decade above the limit frequency. It is also possible to use another filter algorithm, e.g., in order to compensate for the frequency dependency of the amplitude ratios between the wheel speed and the jerk signal j. The characteristic variable S_Schwing is represented by the filtered jerk signal j_Filt as follows:

$$S\_(Schwing,F) = \int (|j\_Filt| - j\_Toleranz) dt \qquad (3)$$

With such a characteristic variable S_(Schwing,F) it is possible to detect a poor roadway.

Another advantageous embodiment of the method according to the invention is achieved particularly well a1) in that an expected jerk signal value j_erwartet is determined as the correction jerk value from a braking torque gradient M_Bremsgrad generated at the vehicle wheel, and a2) the characteristic variable S_(Schwing,F) is obtained according to method step b) by using the absolute value of the difference between the jerk signal j or j_Filt determined in method step a) and the correction jerk value j_erwartet.

The characteristic variable S_(Schwing,F,erw) is defined with this expected jerk signal value j_erwartet, as the correction value, according to the following formula:

$$S\_(Schwing,F,erw) = \int (|j\_Filt - j\_erwartet| - j\_Toleranz) dt.$$

It is therefore advantageously possible to select the tolerance threshold j_Toleranz to be low, i.e., small, by taking account of changes in wheel acceleration resulting from the changes in brake pressure produced by the ABS control, since otherwise said tolerance threshold j_Toleranz must be selected to be large, in order to prevent an error in detecting a poor roadway when the ABS control itself induces a change in pressure and, therefore, a jerk, by means of the pressure modulation.

In order to determine the expected jerk signal value j_erwartet at a low tolerance threshold j_Toleranz, it is advantageous according to a refinement when the expected jerk signal value j_erwartet is determined from the change in braking pressure (dp_Brems)/dt effected by the braking torque M_Brems, since there is a direct relationship between the braking pressure p and the braking torque M_Brems, on the one hand, and, on the other hand, via the mass moment of inertia, a direct relationship between the moment and the rotational acceleration of a body. The expected jerk signal value j_erwartet is therefore expressed as:

$$j\_erwartet = F \cdot (dp\_Brems)/dt,$$

wherein (dp_Brems)/dt is the braking pressure gradient and F is a negative calibration factor. This calibration factor must therefore be selected to be negative, since a negative braking pressure gradient, which effects a pressure reduction, results in a positive change in acceleration, i.e., a positive jerk signal.

It has been proven to make sense, however, when using the expected jerk signal value [[j]]_erwartet, i.e., to carry out method step a2) only when the expected jerk signal value j_erwartet and the jerk signal j or the filtered jerk signal j_F have the same sign.

The limitation in the calculation of the expected jerk signal value [[j]]_erwartet to the braking pressure modulations triggered by the ABS control is based on the fact that the slip control typically takes place exclusively via a modulation of the braking torques, and drive torques, drag torques, or regenerative torques change relatively slowly and therefore do not need to be taken into account. If these variables change more rapidly due to a changed ABS control strategy, they must also be additively incorporated into the calculation of the expected jerk signal value [[j]]_erwartet.

The pressure gradient signal of the ABS system calculated at the current point in time cannot be used in the calculation of the expected jerk signal value [[j]]_erwartet, however, since the change in wheel acceleration at this point in time refers to an earlier point in time. This means that the pressure gradient signals pgrad and the jerk signals j and j_Filt do not proceed synchronously in the controller of the ABS system; the pressure gradient signal must therefore be delayed. According to a refinement, previous pressure gradient signals are therefore used to determine the braking pressure change, i.e., temporarily-stored pressure gradient signals from the most recent computing cycles (loops) are accessed (i.e., not the currently calculated pressure gradient signal)

and, on the basis thereof, the suitable pressure gradient signal is determined (e.g., by calculating the mean). Such a delayed pressure gradient signal is then comparable to the acceleration-change signal detected at the same point in time for calculating the expected jerk signal value [[j]]_erwartet.

The lack of synchronicity of these two signals is caused by the fact that the pressure model used the most in the ABS controller already displays a change in pressure while the hydraulic valves of the ABS system are still executing the pressure change before the new pressure acts on the vehicle wheel. Moreover, there is a further time delay also between the real rotational behavior of the vehicle wheel and the measured rotational behavior.

According to another advantageous embodiment of the invention, in order to determine the expected jerk signal value [[j]]_erwartet the pressure gradient signal pgrad effecting the change in braking pressure is filtered, whereby similar signal properties of the signals to be compared are created and, therefore, a more accurate value for the jerk signal value [[j]]_erwartet is obtained.

If an exact synchronization of the jerk signal j or j_Filt and the braking pressure gradient signal is not possible, filtering the pressure gradient signal results in the signals being "smoothed" in such a way that a comparison can be carried out over a relatively long time period and, therefore, an error in the synchronization does not have such a strong effect.

A further improvement of the characteristic variable S_Schwing, S_(Schwing,F) or S_(Schwing,F,erw) can be achieved according to another embodiment of the invention by forming the sum or the integration according to method step b) as a function of the sign of the jerk signal j or j_Filt by limiting the increase in the sum or the increase in the value of the integral per computing cycle (loop) to a gradient limit value, or by using different tolerance values.

It is preferably provided in the case of a positive jerk signal j or a positive filtered jerk signal j_Filt and a positive difference between the jerk signal j or the filtered jerk signal j_Filt and the expected jerk signal value [[j]]_erwartet that the gradient limit value is greater than the gradient limit value in the case of a negative jerk signal j_Filt or a negative filtered jerk signal j_Filt and a negative difference between the jerk signal j_Filt or the filtered jerk signal j_Filt and the expected jerk signal value [[j]]_erwartet.

This means that, in the case of an unexpected positive jerk j>0 or j_Filt>0 and [[j–j]]_erwartet>0 or [[j_Filt–j_erwartet>0 is allowed to increase more rapidly than in the case of an unexpected negative jerk j<0 or j_Filt<0 and [[j–j]]_erwartet<0 or [[j_Filt–j]]_erwartet<0, since a negative jerk, without a previous pressure change during an ABS control, can also occur "naturally", e.g., when there is an increase in the wheel deceleration, when the vehicle wheel is just exceeding the peak of the μslip curve or when the vehicle wheel returns from the unstable region into the stable region of the slip curve when the re-acceleration ends, whereas a positive jerk, i.e., during a transition from a wheel deceleration into a re-acceleration, is usually always preceded by a reduction in the braking torque.

Furthermore, according to a preferred refinement of the invention, the road condition determined with the aid of the characteristic variable S_Schwing, S_(Schwing,F) or S_(Schwing,F,erw) is used in the course of braking pressure control, during both partial braking and full braking, preferably in an ABS braking system having anti-lock braking control, by adjusting the controlled variables and/or the filter variables of the braking pressure control if the vibration signal threshold value Ggrenz is exceeded by the character-istic variable S_Schwing, S_(Schwing,F) or S_(Schwing,F, erw). Therefore, the ABS control becomes less sensitive when a poor roadway is identified, i.e., underbraking of the vehicle is avoided and, therefore, the braking performance is improved.

The slip threshold, as the controlled variable, is preferably raised, in order thereby to permit the braking torque to be reduced only once the vehicle wheel has substantial slip. It is advantageous to raise the slip threshold not only at the vehicle wheel at which the characteristic variable S_Schwing, S_(Schwing,F) or S_(Schwing,F,erw) indicates a poor roadway, but rather at all vehicle wheels, in order to compensate for the influence of an excessive reference speed in the determination of the current slip value.

More intensive filtering can be carried out for controlled variables in the ABS control. In general, filtering is always a compromise, however, since the desired effect of filtering out disturbances in the signal is always associated with an unwanted effect of the time delay in the useful signal, the control performance being degraded by the resultant time delay. In order to minimize these negative effect, filtering is generally carried out no more than is absolutely necessary. In accordance with a refinement, the vibration detection according to the invention can minimize this effect by increasing the filtering intensity of the controlled variables of the ABS control when the jerk signal threshold is exceeded by the characteristic variable [[S]]_Schwing, S_(Schwing,F) or S_(Schwing,F,erw). Therefore, when a poor roadway considered to be a disturbance is detected, the filtering of the ABS controlled variables is selectively intensified such that the advantage of filtering out disturbances compensates for the disadvantage of the time delay.

In order to avoid unnecessarily deep pressure reductions, which can result from a strongly negative wheel acceleration, it is also advantageous to calculate both a filtered and an unfiltered wheel acceleration for the control and to then use the less negative signal to calculate the ABS pressure modulation.

Due to the adjustments made in the ABS control, which take place via the vibration detection to determine the road condition, there are even advantages to be achieved indirectly for travel on a roadway that is not poor, since fewer precautions for a possible poor road need to be taken in that case.

able (S_oscillate) with an oscillation signal threshold value (Glimit).

The invention claimed is:

1. A method for determining road conditions during unbraked or braked travel of a vehicle a wheel-specific characteristic variable which is derived from a temporal change in wheel speed ($\phi'$) detected, the method comprising:
 a) forming, by an anti-lock braking system (ABS) controller of the vehicle, a jerk signal (j) by computing for at least one vehicle wheel a second derivative of the wheel speed ($\phi'$) detected by at least one wheel speed sensor of the vehicle,
 b) summing or integrating, by the ABS controller, a difference between an absolute value (|j|) of the jerk signal and a tolerance value with respect to time in order to compute a characteristic variable,
 c) determining, by the ABS controller, the road condition by comparing the characteristic variable with a vibration signal threshold value, and
 d) reducing, by the ABS controller, sensitivity for deciding when to apply a braking force to the at least one vehicle wheel when the vibration signal threshold value is exceeded by the characteristic variable.

2. The method as claimed in claim 1, further comprising filtering the jerk signal (j) by a low-pass filter, in order to generate a filtered jerk signal before the method step b) is carried out.

3. The method as claimed in claim 2, wherein
   a1) an expected jerk signal is determined as the correction jerk value from a braking torque gradient generated at the vehicle wheel, and
   a2) obtaining the characteristic variable according to method step b) by using the absolute value of the difference between the jerk signal determined in method step a) and the correction jerk value.

4. The method as claimed in claim 1, wherein
   a1) an expected jerk signal is determined as the correction jerk value from a braking torque gradient generated at the vehicle wheel, and
   a2) obtaining the characteristic variable according to method step b) by using the absolute value of the difference between the jerk signal determined in method step a) and the correction jerk value.

5. The method as claimed in claim 4, wherein method step a2) is carried out only when the expected jerk signal value and the jerk signal or the filtered jerk signal have the same sign.

6. The method as claimed in claim 5, wherein the expected jerk signal value is determined from a change in braking pressure $$\left(\frac{dp_{Brems}}{dt}\right)$$

effecting the braking torque gradient.

7. The method as claimed in claim 4, wherein the expected jerk signal value is determined from a change in braking pressure $$\left(\frac{dp_{Brems}}{dt}\right)$$

effecting the braking torque gradient.

8. The method as claimed in claim 7, wherein previous pressure signals are used to determine the change in braking pressure $$\left(\frac{dp_{Brems}}{dt}\right).$$

9. The method as claimed in claim 8, wherein a pressure signal (p) effecting the change in braking pressure $$\left(\frac{dp_{Brems}}{dt}\right)$$

is filtered.

10. The method as claimed in claim 1, wherein the sum is calculated according to method step b) as a function of the sign of the jerk signal by limiting the increase in the sum per computing cycle to a gradient limit value, or by using different tolerance values.

11. The method as claimed in claim 10, wherein in the case of a positive jerk signal or a positive filtered jerk signal and a positive difference between the jerk signal or the filtered jerk signal and the expected jerk signal value, the gradient limit value is greater than the gradient limit value in the case of a negative jerk signal or a negative filtered jerk signal and a negative difference between the jerk signal or the filtered jerk signal and the expected jerk signal value.

12. The method as claimed in claim 11, wherein the filtering intensity of the filter variables is increased when the vibration signal threshold value is exceeded by the characteristic variable.

13. The method as claimed in claim 1, wherein the road condition determined with the aid of the characteristic variable is used in the course of braking pressure control, in an ABS braking system having anti-lock braking control, by adjusting the controlled variables and/or the filter variables of the braking pressure control if the vibration signal threshold value is exceeded by the characteristic variable.

14. The method as claimed in claim 13, wherein a slip threshold is raised as the controlled variable.

15. The method as claimed in claim 13, wherein the filtering intensity of the filter variables is increased when the vibration signal threshold value is exceeded by the characteristic variable.

16. The method as claimed in claim 1, wherein the road condition determined with the aid of the characteristic variable is used in the course of braking pressure control, by adjusting the controlled variables and/or the filter variables of the braking pressure control if the vibration signal threshold value is exceeded by the characteristic variable.

* * * * *